United States Patent
Bongiorno

(10) Patent No.: US 7,350,833 B2
(45) Date of Patent: Apr. 1, 2008

(54) SELF-ALIGNING ASEPTIC FLANGED JOINT

(76) Inventor: Louis C. Bongiorno, 73 Birchwood Dr., Millington, NJ (US) 07946

( * ) Notice: Subject to any disclaimer, the term of this patent is extended or adjusted under 35 U.S.C. 154(b) by 191 days.

(21) Appl. No.: 11/077,950

(22) Filed: Mar. 11, 2005

(65) Prior Publication Data

US 2005/0200128 A1    Sep. 15, 2005

Related U.S. Application Data

(60) Provisional application No. 60/553,259, filed on Mar. 15, 2004.

(51) Int. Cl.
*F16L 17/00* (2006.01)
(52) U.S. Cl. .................. 285/367; 285/365; 277/608
(58) Field of Classification Search ............... 285/367, 285/350, 336; 277/608, 908, 616, 624
See application file for complete search history.

(56) References Cited

U.S. PATENT DOCUMENTS

| | | | |
|---|---|---|---|
| 2,744,771 A | 5/1956 | Laurent | |
| 3,189,371 A | 6/1965 | Swan | |
| 3,573,873 A | 4/1971 | Pearson | |
| 3,775,832 A | 12/1973 | Werra | |
| 3,836,159 A | 9/1974 | Dryer | |
| 4,155,571 A | 5/1979 | Gastineau et al. | |
| 4,159,132 A | 6/1979 | Hitz | |
| 4,311,248 A | 1/1982 | Westerlund et al. | |
| 4,418,948 A | 12/1983 | Lew et al. | |
| 4,817,994 A | 4/1989 | Bronnert | |
| 5,076,617 A | 12/1991 | Bronnert | |
| 5,518,280 A | 5/1996 | Mann | |
| 5,556,113 A | 9/1996 | Amorese et al. | |
| 5,851,033 A | 12/1998 | Hunt et al. | |
| 5,947,533 A * | 9/1999 | Fisher et al. | ............. 285/350 |
| 6,234,545 B1 | 5/2001 | Babuder et al. | |
| 6,267,414 B1 | 7/2001 | Mosse | |
| 6,409,180 B1 | 6/2002 | Spence et al. | |
| 6,857,638 B2 * | 2/2005 | Dupont et al. | ............. 285/336 |
| 2002/0027327 A1 | 3/2002 | Sugimoto et al. | |
| 2002/0030326 A1 | 3/2002 | Bettencourt | |
| 2002/0070543 A1 | 6/2002 | Aaron, III | |
| 2002/0124961 A1 | 9/2002 | Porter et al. | |

* cited by examiner

*Primary Examiner*—Aaron Dunwoody
(74) *Attorney, Agent, or Firm*—Ernest D. Buff & Associates, LLC; Ernest D. Buff; Gordon E. Fish

(57) ABSTRACT

A flanged joint system connects two pipes disposed along a common axis. A flange having a mating surface terminates each pipe. A gasket assembly comprising an outer annular, substantially rigid retaining ring and a peripheral alignment rim, an inner deformable annular sealing member is interposed between the mating surfaces of the flanges. The flanges and gasket assembly are aligned in mutually coaxial relationship by receipt of the flanges within the alignment rim. The flanges are clamped together with their mating surfaces in axially aligned, facing relationship. The retaining ring limits the impingement of the flanges and prevents overcompression of the deformable material. The joint is reliable and durable, and permits aseptic processing conditions to be maintained. Servicing and gasket replacement are readily accomplished.

18 Claims, 9 Drawing Sheets

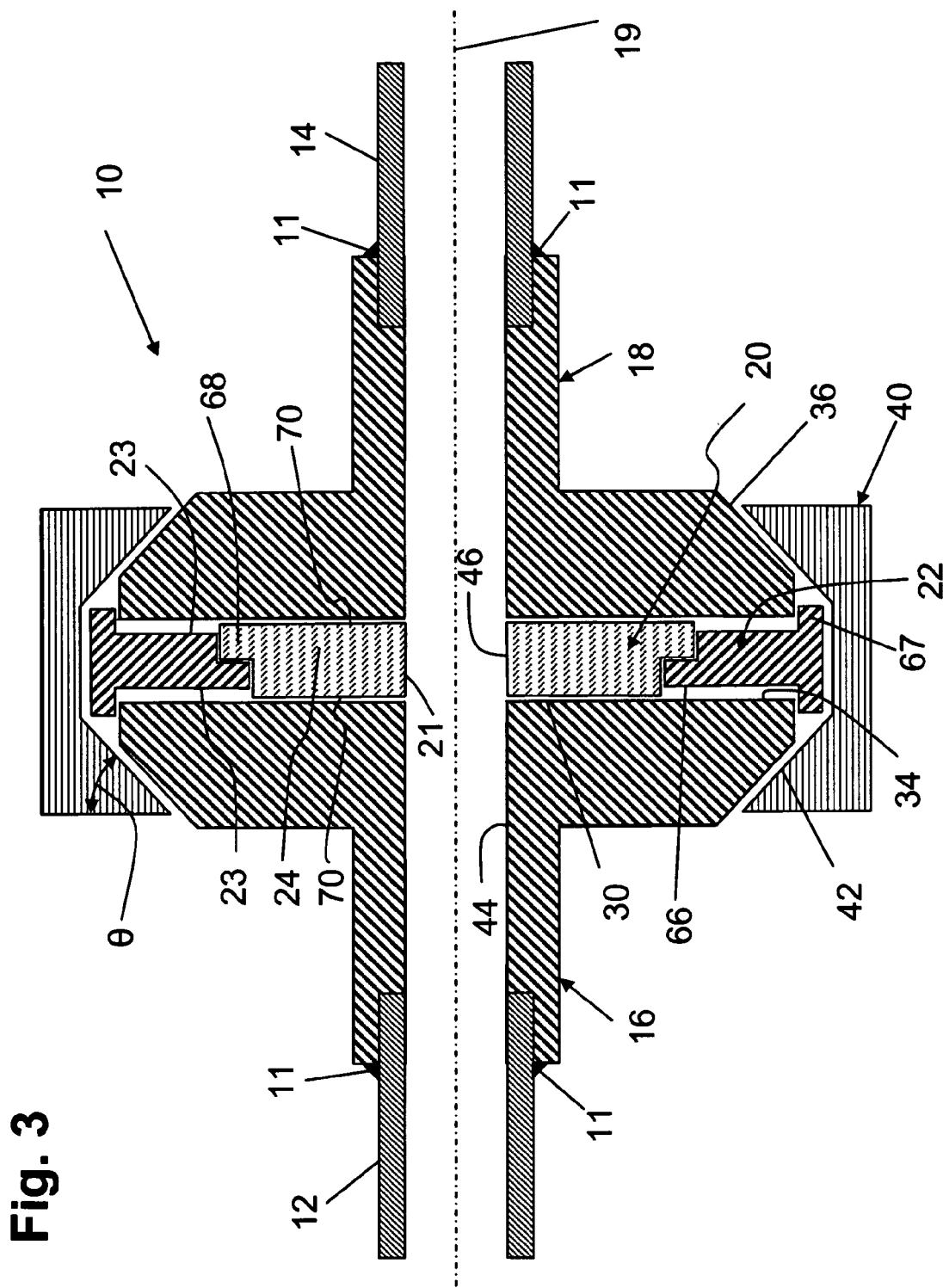

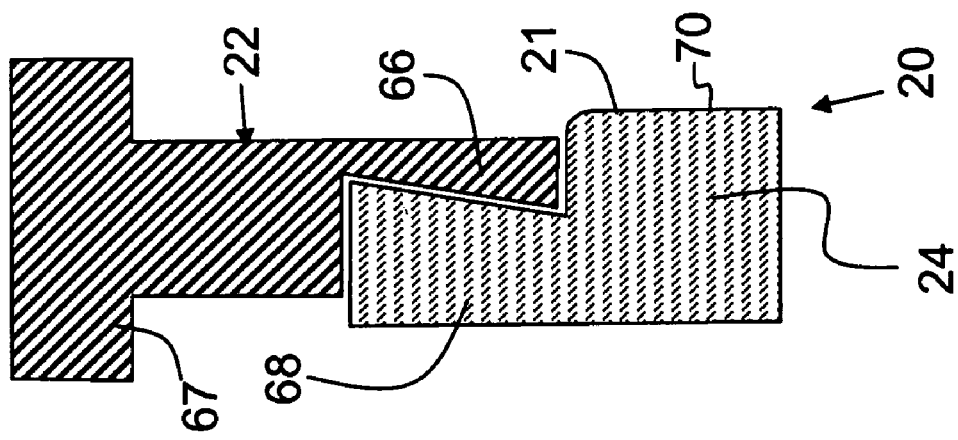
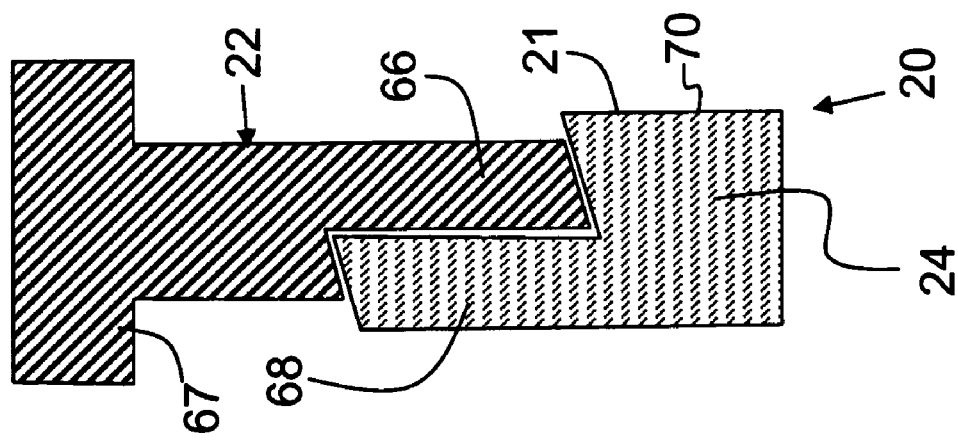
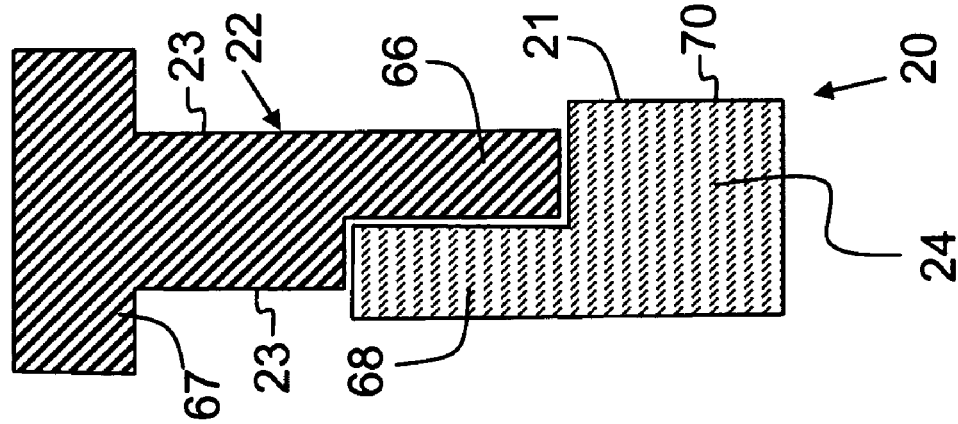

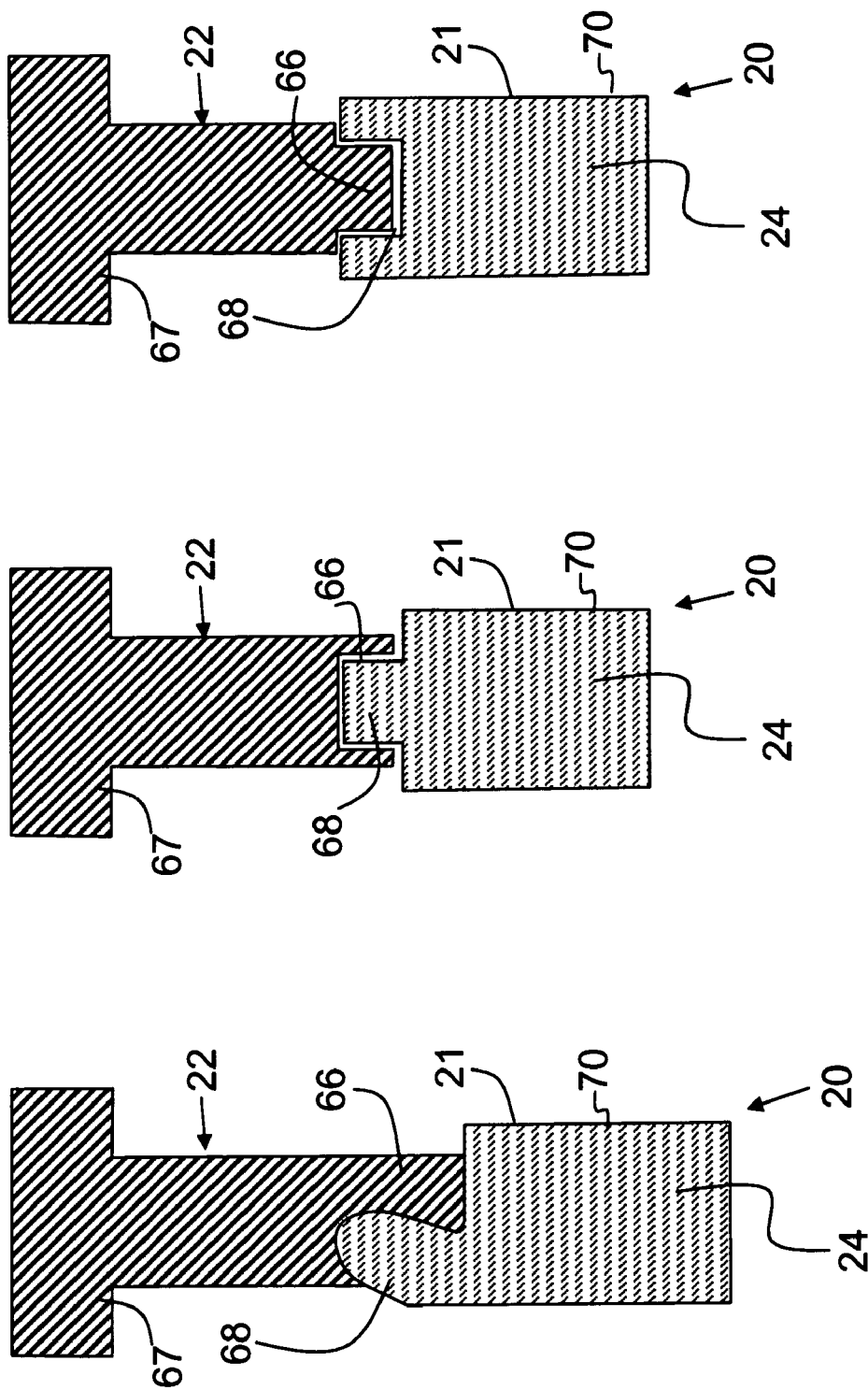

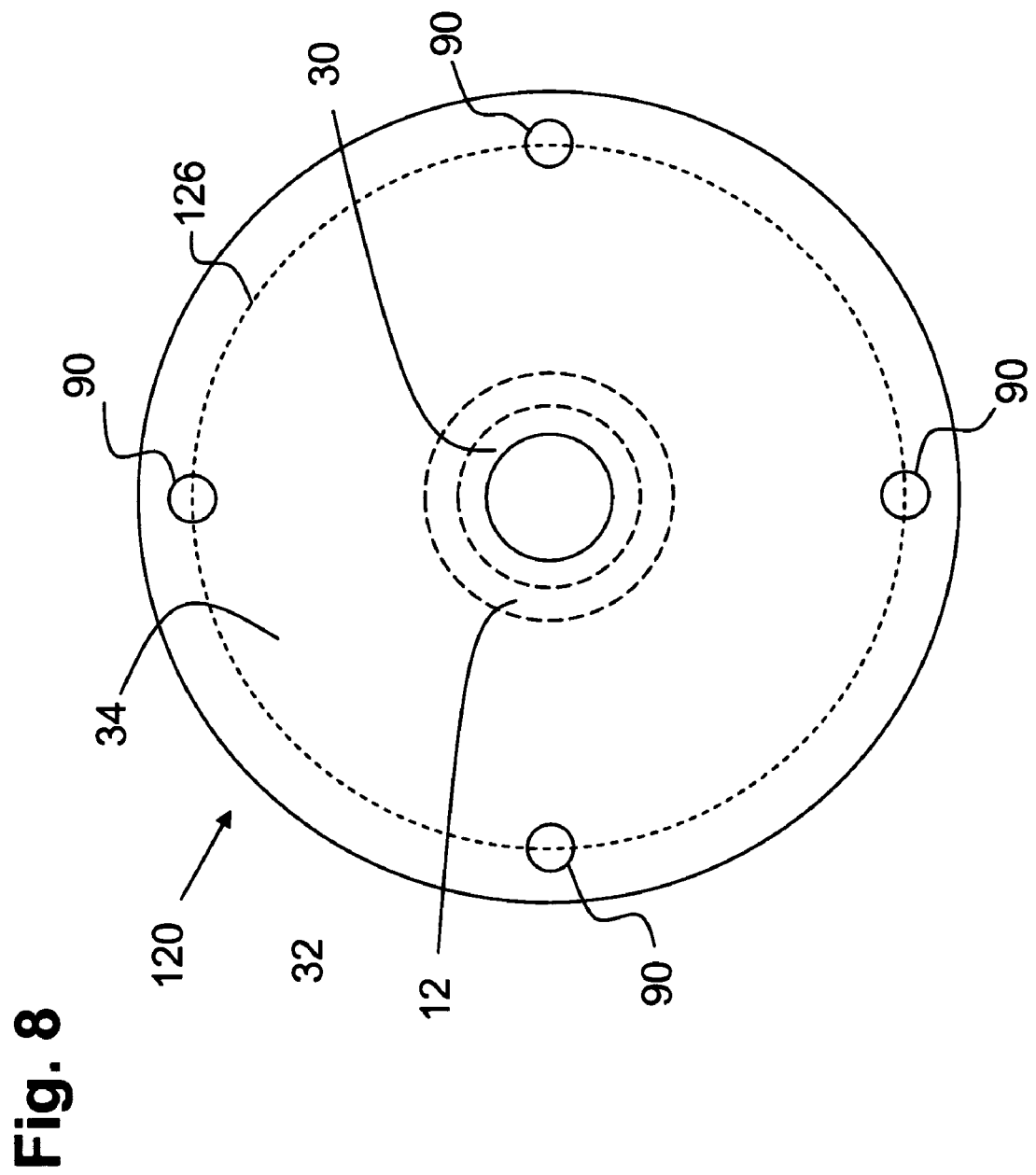

SELF-ALIGNING ASEPTIC FLANGED JOINT

This application claims the benefit of U.S. Provisional Application No. 60/553,259, filed Mar. 15, 2004.

BACKGROUND OF THE INVENTION

1. Field of the Invention

This invention relates to the joining of tubes or pipes, and more particularly, to an aseptic flanged joint between pipes employing a self-aligning rigid retaining ring surrounding a gasket and limiting the deformation thereof.

2. Description of the Prior Art

Flanged joints are widely used to interconnect tubes or pipes conveying a variety of fluids, including gases, liquids, liquids also containing solid or semi-solid matter, or other fluid-like media. The tubes may be either pressurized or under vacuum. The joints connect extended sections of tubes, as well as joining tubes to fittings, couplers, valves, pumps, inspection ports, and other related devices. An ideal joint is easily assembled with minimal cost and labor, and is capable of operating reliably under any conditions reasonably anticipated during its service life. It is essential that the joint remain sealed to prevent leakage either into or out of the system in which the tube is used. The materials comprised in the joint must be chemically and thermally compatible under operating conditions with substances they will contact and the surfaces of the joint fittings. In many cases, it is further required that the joint be easily disassembled for repair and maintenance operations, including the cleaning and sanitizing of systems and replacement of gaskets or the like. Ideally, the presence of the joint does not introduce any protrusion or other interruption of the uniform surface inside the piping that would increase the flow resistance of the piping, e.g. by disrupting or impeding the smooth flow of fluid therethrough.

The requirements for joints, including flanged joints, used in process systems that convey food, beverage, pharmaceutical, personal care, or other like products intended for human or animal use through ingestion or external application are especially demanding. These systems must be maintained under strictly aseptic conditions. As used herein and in the subjoined claims with reference to a process system, the term "aseptic condition" is understood to mean a condition in which there is substantially no growth of unwanted or pathogenic organisms and substantially no buildup of debris or other medium in which such organisms are likely to reproduce or be trapped, agglomerated, concentrated, or otherwise situated in a manner that is likely to contaminate any substance passing through the system. The term "aseptic product" is to be understood as referring to any of the aforementioned products that ordinarily must be processed under aseptic conditions. Moreover, no materials can be used in aseptic joint systems that would introduce any harmful or objectionable substances into the process stream for the aforementioned aseptic products. Many piping and joint systems that might be acceptable for general chemical or industrial processing are not able to satisfy one or more of the stringent requirements associated with processing aseptic products. For example, some known joint systems have a configuration wherein recesses, crevasses, O-ring grooves, or the like result in dead spaces or stagnation regions in which there is little or no flow of the fluid being transported. As a result, accumulation of debris likely to give rise to the accumulation and reproduction of pathogens is a serious concern. Also, some known gasket materials may impart objectionable flavors or even toxic substances into food, beverages, or pharmaceuticals. Furthermore, the use of certain substances that come into contact with the process fluid may be offensive to adherents of certain religious traditions.

A variety of techniques are in widespread use for making interconnections. Flanged joints employing deformable gasket material that is interposed between the flanges and deformed by axial compression between the flanges are commonly used. Various materials have been used for such gaskets, such as elastomeric materials, impregnated fibrous materials, and soft metal sheets. One form of such joint and seal is depicted generally at 9 in FIG. 1. Joint 9 connects generally cylindrical tubes 12, 14, which are attached to flanges 6, 8 (also known as ferrules) by welding 11, as shown, or by various other known techniques. Flanges 6 and 8 adjoin in end-to-end relationship about a common center axis 19. The flanges are substantially identical and have mating faces generally perpendicular to axis 19. Opposite the mating face of each flange is a clamping face including tapered section 36. When flanges 6 and 8 are mated, respective sections 36 cooperate to form a generally frustoconical peripheral surface. The joint is secured using clamp 40 and sealed using O-ring gasket 17. The flanges used on each side of joint 9 are substantially identical in shape.

The mating face surface of flanges 6 and 8 has an inner portion 30 and an outer portion 34 that are generally co-planar, along with an intermediate circumferential groove or recess 32 that accommodates gasket 17, which is in the form of a synthetic rubber O-ring, i.e. a cylindrical gasket having the shape of a torus or donut. The O-ring is located and received in grooves 32. Normally flanges 6 and 8 both include a groove 32. However, joints are sometimes used in which a groove is provided in only one of the flanges, the other flange having a fully planar mating surface. Of course, the groove in such embodiments must be correspondingly deeper. In other instances, the gasket is a cylindrical O-ring with a rectangular cross-section (not shown) instead of the more commonly used circular cross-section.

Joint 9 is secured with a split-ring clamp 40, which is ordinarily composed of metal. A major portion of the inner circumferential surface of clamp 40 has a V-shape with tapered surface portions 42. These tapered surfaces encircle and securingly engage correspondingly tapered outer sections 36 of flanges 6 and 8. Clamp 40 is split into a plurality of arc-like segments. As further illustrated in the form depicted in FIG. 2, clamp 40 has two generally semicircular arc segments 50, 52, each subtending an angle slightly less than 180°. Segments 50 and 52 are both bifurcated at each of their ends. A rigid linkage 54 joins ends 51 and 53 of segments 50 and 52, respectively, and is disposed between the furcations. Retaining pins 55 pass through and are secured in holes in ends 51 and 53. Pins 55 also pass freely through holes in opposite ends of linkage 54 to create rotatable joints between the segments 50, 52 and linkage 54, allowing segments 50 and 52 to pivot about pin 55 within a common plane. The opposite ends of segments 50 and 52 have enlarged, furcated ends 58 and 59, respectively. A retaining pin 62 passes through and is secured in holes in end 59. Pin 62 also passes freely through the eye of threaded eyebolt 60, which is located between the furcations of end 59. To secure the clamp, the free end of eyebolt 60 is rotated about pin 62 and into the space between the furcations of end 58. A threaded nut 64 is tightened onto eyebolt 60 and against a flat surface of furcated end 58 to place clamp 40 in closed position, as shown in FIG. 2.

The tightening of nut 64 acts to reduce the effective circumference of clamp 40. The resulting wedging of frustoconically tapered inner clamp surface 42 over opposed, complementary frustoconical sections 36 of the two flanges imparts an axially directed force urging the flanges together. Proper design of joint 9 requires that the degree of tightening clamp 40 that brings corresponding surfaces 30 and 34 of flanges 6 and 8 into contact causes a requisite degree of compression of O-ring 17. Proper sealing is effected if O-ring 17 substantially fills grooves 32 of both flanges, with contact between O-ring 17 and grooves 32 on each side that extends around the full circumference of each flange.

However, in practice a number of problems occur in reliably effecting seals using joints of the type depicted by FIG. 1. Ideally, both the application of clamp 40 depicted in FIG. 1 and the full seating of O-ring 17 in respective facing grooves 32 provide the required lateral alignment of the opposed flanges. At best, O-ring 17 provides only minimal lateral alignment of respective grooves 32. It is frequently found that joints are made up with the flanges not fully coaxially aligned. As a result, the corresponding grooves 32 in the two flanges are not aligned and O-ring 17 often is not fully and properly seated in both grooves 32. In this circumstance, tightening of clamp 40 may compress at least part of O-ring 17 between surfaces 30 or 34. Damage to the O-ring is likely, especially in parts that traverse the edges between groove 32 and the adjacent planar surfaces 30 or 34. Premature failure of the O-ring to seal commonly results. Moreover, surfaces 30 and 34 may not properly seat in this situation, in many cases creating a recess between surfaces 30 into which process fluid present in tubes 12 and 14 can collect. In some cases such a recess communicates with portions of groove 32 not filled with O-ring 17, increasing the likelihood of untoward consequences, such as microbial activity as described in detail above. A joint system that more positively assures proper alignment and a durable, effective seal is thus highly sought.

Moreover, even if the flanges are accurately aligned and the O-ring seal properly disposed in its grooves, the joint system of FIGS. 1-2 is prone to certain difficulties. The axial impingement of the mating flanges after the clamp is secured is limited by metal-to-metal contact of the flange faces. In some cases, especially after wear and tear that attends repeated assembly and disassembly of the flanged joint, contact occurs in regions 34, leaving some space between facing inner surface regions 30. Frequently, such an area becomes a trap, with the deleterious consequences set forth above.

In many applications, O-ring 17 must be replaced periodically. In some industrial manufacturing processes, required system repairs or periodic preventive maintenance dictate that flanged joints be disassembled and reassembled frequently. Exposure to required processing temperatures or to corrosive or abrasive process fluids in some cases causes seal materials to erode. Some materials are embrittled over time by exposure to their process environment. Moreover, many seal materials exhibit creep or related mechanical phenomena or otherwise lose their elasticity and take a permanent "set." Joints that are clamped together repeatedly despite poor alignment also are likely to result in wear or damage (e.g. scratching) to mating surfaces 30, 34, which may also compromise seal integrity. Cleaning and sanitary protocols demand regular service of joints and replacement of seals in still other instances. The actual cost of the O-ring and other elastomeric components typically is small in comparison with the labor costs for their replacement and the losses due to manufacturing downtime. However, the metal parts of the joint are generally far more expensive due to the precision machining and dimensional control needed. As a result, it is highly desired that metal parts be reusable.

Notwithstanding numerous improvements in the materials and configurations known for flanged joints, there remains a need in the art for a joint system that is inexpensive to construct and simple to maintain, yet provide reliable and robust service. It is further desirable that the system can be serviced by workers who do not need extensive training or a high skill level yet can accomplish needed repairs expeditiously to minimize costly downtime in a process system.

SUMMARY OF THE INVENTION

The present invention provides a flanged joint system for aseptically connecting first and second pipes disposed along a common axis. A first flange terminates the first pipe and a second flange terminates the second pipe. The flanges are generally circular and have a flange outside diameter and a mating surface that optionally includes a circumferential flange groove therein. The pipes are oriented such that the mating surfaces are substantially perpendicular to the common axis and in facing, parallel relationship. A gasket assembly is interposed between the flanges and aligned in mutually coaxial relationship. The gasket assembly comprises: (i) an outer annular, substantially rigid retaining ring having opposed axial surfaces that abut at least a portion of the flanges' mating surfaces; an alignment rim encircling an outside periphery of the ring and extending axially from each of said axial surfaces; a retaining shoulder projecting radially inward; and a retaining shoulder projecting radially inward; and (ii) an inner deformable annular sealing member having a radially inner annular portion having a rectangular cross-section and sealing surfaces on the axial sides of the rectangular portion; and an encircling sealing shoulder portion that projects radially outward. The alignment rim is sized to slippably receive the outside diameter of the flanges on opposite sides of the retaining ring. The sealing shoulder portion is shaped to receive the retaining shoulder and is removably engaged therewith. The gasket assembly is aligned coaxially with the flanges by receipt of the flange outside diameters within the alignment rim. The joint is secured by a clamp means, such as a split-ring clamp, that urges the flanges together axially. The compression of the deformable annular sealing member is restricted to a preselected extent by abutment of the axial surfaces of the retaining ring with the mating surfaces of the flanges.

In another aspect, the invention provides a method for assembling a flanged joint connecting first and second pipes disposed along a common axis. The method comprises: (i) providing a first flange terminating the first pipe and a second flange terminating the second pipe, the flanges being generally circular and having a flange outside diameter and a mating surface; (ii) providing a gasket assembly; (iii) orienting the flanges such that the mating surfaces are substantially perpendicular to the common axis and in facing, parallel relationship; (iv) interposing the gasket assembly between the flanges; and (v) clamping the flanges together axially. The gasket assembly comprises an outer annular, substantially rigid retaining ring and an inner deformable annular sealing member. The retaining ring has an alignment rim encircling an outside periphery of the ring and extending axially from each of said axial surfaces, and a retaining shoulder projecting radially inward. The alignment ring is sized to slippably receive the outside diameter of the flanges on opposite sides of the retaining ring. The sealing member has a radially inner annular portion having a rectangular cross-section and sealing surfaces on the opposed axial sides of the rectangular portion and an encircling sealing shoulder portion that projects radially outward, said sealing shoulder portion being shaped to receive said retaining shoulder and being removably engaged therewith. The alignment rim is sized to slippably receive the outside diameter of the flanges on opposite sides of the retaining ring. Alignment of the flanges and the gasket assembly in mutually coaxial relationship is effected by receipt of the outside diameters of the flanges within the alignment ring. The clamping of the flanges axially compresses the deformable annular sealing member to a preselected extent, the compression being restricted by abutment of the respective axial surfaces of the retaining ring and the mating surfaces of the flanges.

The use of the outer retaining ring in the gasket assembly limits the axial impingement of the flanges, thereby insuring that a preselected, proper degree of compression of the deformable portion of the gasket assembly is achieved. Excessive tightening, which frequently causes undesirable extrusion and possible removal of deformable gasket material into the bore of the joint assembly, is effectively prevented. Misalignment or misplacement of the gasket assembly within the flange joint is likewise minimized.

The present flange joint system virtually eliminates the formation of traps in recesses of the joint in which process fluid can collect or stagnate, which frequently leads to the presence or growth of harmful microbes or other pathogenic organisms. The joint is easily assembled and disassembled to permit servicing, including replacement of the gasket assembly. The separability of the sealing member and the retaining ring of the gasket permit the former to be replaced and the latter, which is ordinarily more expensive to manufacture, to be reused. The joint is reliable and durable. The servicing can be carried out expeditiously by personnel who need not have a high level of skill, thereby lessening maintenance costs and manufacturing downtime.

BRIEF DESCRIPTION OF THE DRAWINGS

The invention will be more fully understood and further advantages will become apparent when reference is had to the following detailed description of the various embodiments of the invention and the accompanying drawings, wherein like reference numerals denote similar elements throughout the several views, and in which:

FIG. 3 is a cross-sectional view depicting a flanged joint system of the invention connecting two pipes disposed along a common axis, with the cross section being taken along a common diametrical plane of the pipes;

FIGS. 4A-4F are enlarged, cross-sectional views of various gasket assemblies of the invention, each assembly comprising a radially outer retaining ring engaged with a radially inner sealing member, the different views showing different forms of engagement:

FIG. 4A shows a rectangular step engagement;
FIG. 4B shows a multiply angulated step engagement;
FIG. 4C shows a singly angulated step engagement;
FIG. 4D shows a rounded, lobed engagement;
FIG. 4E shows a mortise and tenon engagement;
FIG. 4F shows another form of mortise and tenon engagement;

FIG. 8 is an axial plan view of one of the flanges of FIG. 7, the view being taken as shown by VIII-VIII in FIG. 7.

DETAILED DESCRIPTION OF THE PREFERRED EMBODIMENTS

Figure 1:
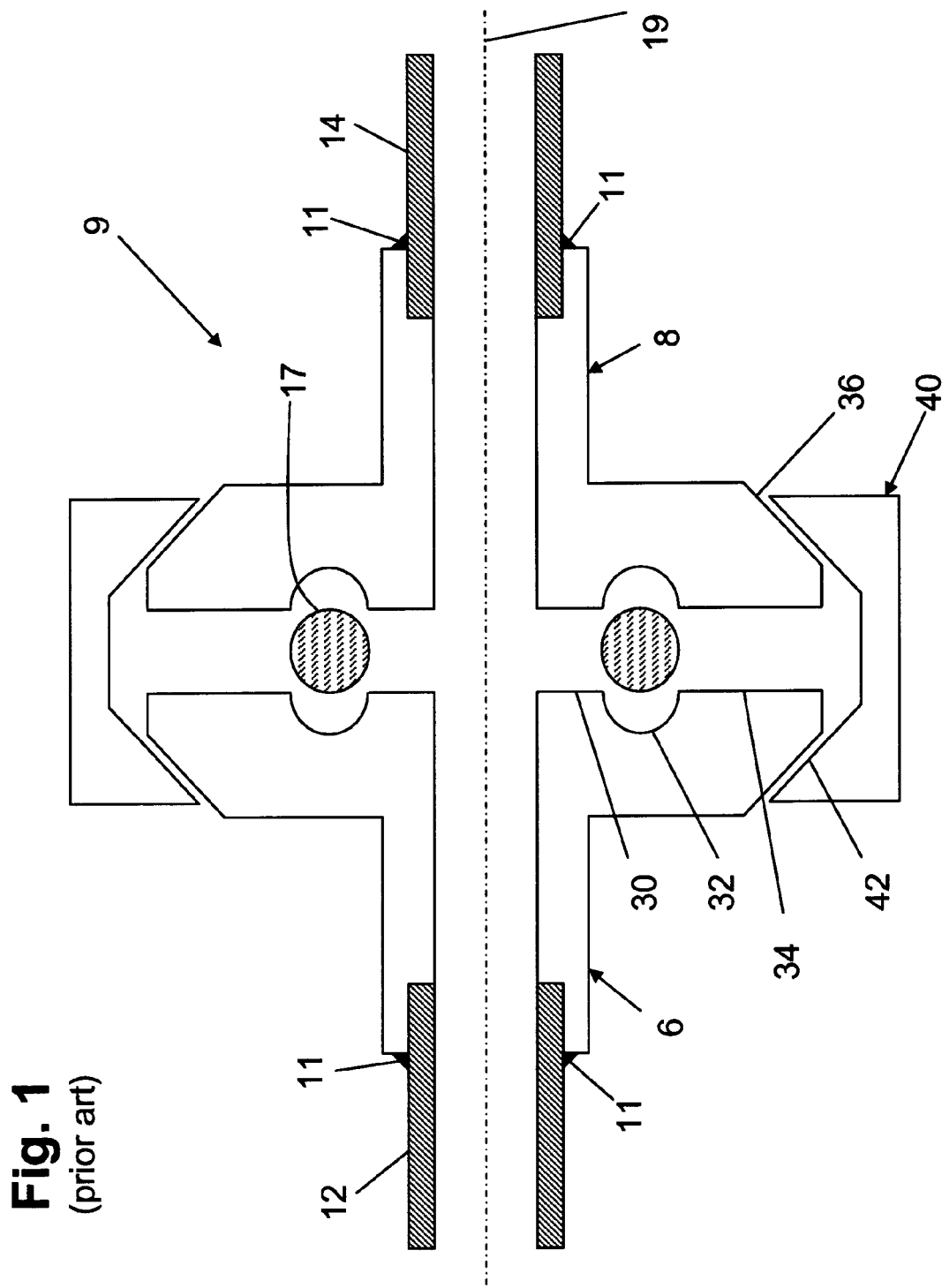
FIG. 1 is a cross-sectional view depicting a prior art flanged joint connecting two pipes disposed along a common axis, with the cross section being taken along a common diametrical plane of the pipes.

Referring to FIG. 3 there is depicted an embodiment of a flanged joint system of the invention. Joint 10 connects generally first and second cylindrical tubes 12, 14, which are welded 11 to first and second flanges 16, 18 (also known as ferrules). Alternatively, the tubes may be attached by any other suitable method, non-exclusively including brazing, soldering, threaded connection, or any other similar technique that provides a durable, leak-resistant connection. Flanges 16 and 18 adjoin in end-to-end relationship about a common center axis 19. The flanges are substantially identical and have mating surfaces generally perpendicular to axis 19. Opposite the mating surfaces are clamping surfaces that include tapered portions 36, which cooperate to form a generally frustoconical outer peripheral surface when the flanges are juxtaposed. The joint is sealed using gasket assembly 20, which comprises a generally annular, rigid retaining ring 22 that is removably engaged with deformable annular sealing member 21. The mating surfaces of flanges 16 and 18 have an annular inner portion 30, an outer portion 34, and optionally an intermediate circumferential groove or recess (not shown). Surface portions 30 and 34 are generally flat and coplanar.

Retaining ring 22 includes opposed axial surfaces 23, along with alignment rim 67 that encircles the ring's outer periphery and extends axially from each of its axial surfaces 23. Alignment rim 67 is sized to slippably receive flanges 16 and 18. That is to say, the inside diameter of alignment rim 67 is chosen to be slightly greater than the outside diameter of flanges 16 and 18, thereby permitting the flanges to be slid into open, thin cylindrical recesses on each side of ring 22, each recess being bounded on its cylindrical side by rim 67 and on one cylindrical end by one of the axial surfaces 23 of ring 22. As a result, receipt of the flanges 16 and 18 within alignment ring 22 aligns the flanges 16, 18 and ring 22 in mutually coaxial relationship. The close match of the diameters of alignment rim 67 and the flanges 16, 18 virtually eliminates excessive lateral play or gasket misalignment and permits the assembly of the flange joint system to be substantially self-aligning. The thickness of alignment rim 67 in the radial direction is preferably sufficient to afford the extension adequate strength but no so large that it interferes with the closure of clamp 40. The axial extent of rim 67 is sufficient to provide secure alignment of ring 22 and flanges 16, 18. Retaining ring 22 further includes a retaining shoulder 66 projecting radially inward.

Sealing member 21 is composed of a deformable material, preferably one that is resiliently deformable. The radially innermost portion of member 21 is a sealing portion 24 that is substantially rectangular in cross-section. The opposed axial faces 70 of rectangular portion 24 sealingly abut inner face portions 30 of flanges 16 and 18 in the assembled joint system. Sealing member 21 further includes a sealing shoulder portion 68 that projects radially outward and has a shape that is complementary to that of retaining shoulder 66. Sealing shoulder portion 68 and retaining shoulder 66 are removably engaged.

The shape of the inter-engaged retaining shoulder 66 and sealing shoulder portion 68 may take a number of forms. The right-angled step engagement depicted in FIG. 3 and in an expanded view in FIG. 4A, permits the sealing member 21 and retaining ring 22 to be easily separated by slipping the components apart. The right-angled configuration of FIG. 4A, wherein the engagement is provided by surfaces are all either parallel to the plane of the mating surface or perpendicular to both the mating surface and the radial direction of the gasket assembly, is preferred for embodiments in which sealing member 21 is composed of materials with relatively low compliance, such as plastics. Other, more complicated shapes, such as angulated steps, including the multiply angulated step engagement shown in FIG. 4B and the singly angulated step engagement shown in FIG. 4C, provide a more secure inter-engagement but result in a slightly more difficult removal that temporarily entails greater elastic deformation of sealing member 21. Such a configuration is particularly suitable for use with various rubber sealing materials. In still other embodiments, the shoulder structures provide a rounded and lobed engagement, FIG. 4D depicting one such lobed form. Yet other embodiments provide a gasket assembly in which the shoulder structure provides a mortise and mating tenon engagement, such as the rectangular forms depicted by FIGS. 4E and 4F.

The removability of member 21 from ring 22 allows assembly 20 to be renewed by substitution of a new member 21, with ring 22 being reusable. Moreover, some embodiments of the invention permit the sealing member to be made relatively narrow in radial extent compared to the retaining ring. Such a configuration is beneficially used in systems operating at temperatures significantly above or below ambient temperature. In many such instances, the materials used for the sealing member are required to meet stringent operational requirements, including high chemical resistance and high retention of compliance at operating temperatures. In many systems seal materials are exposed to high-pressure gasses or steam, while in others, oils and various organic solvents present a severe challenge. However, many of the materials that satisfy these demanding performance requirements also have coefficients of thermal expansion (CTE) very different from the CTE's of metals typically used for the retaining ring the seals must engage. As a result, many existing seal systems are prone to failures that stem from differential thermal expansion. On the other hand, embodiments of the present gasket assembly wherein the relative amount of seal material is small are much less likely to fail for these reasons.

The flanges used on each side of joint 10 have substantially identical form, rather than having complementary mating male and female forms used in certain other known types of joints. Accordingly, there is great flexibility in constructing and modifying a piping system in which the pipes and associated valves and fittings are assembled with joints configured as provided by the present invention.

Figure 2:
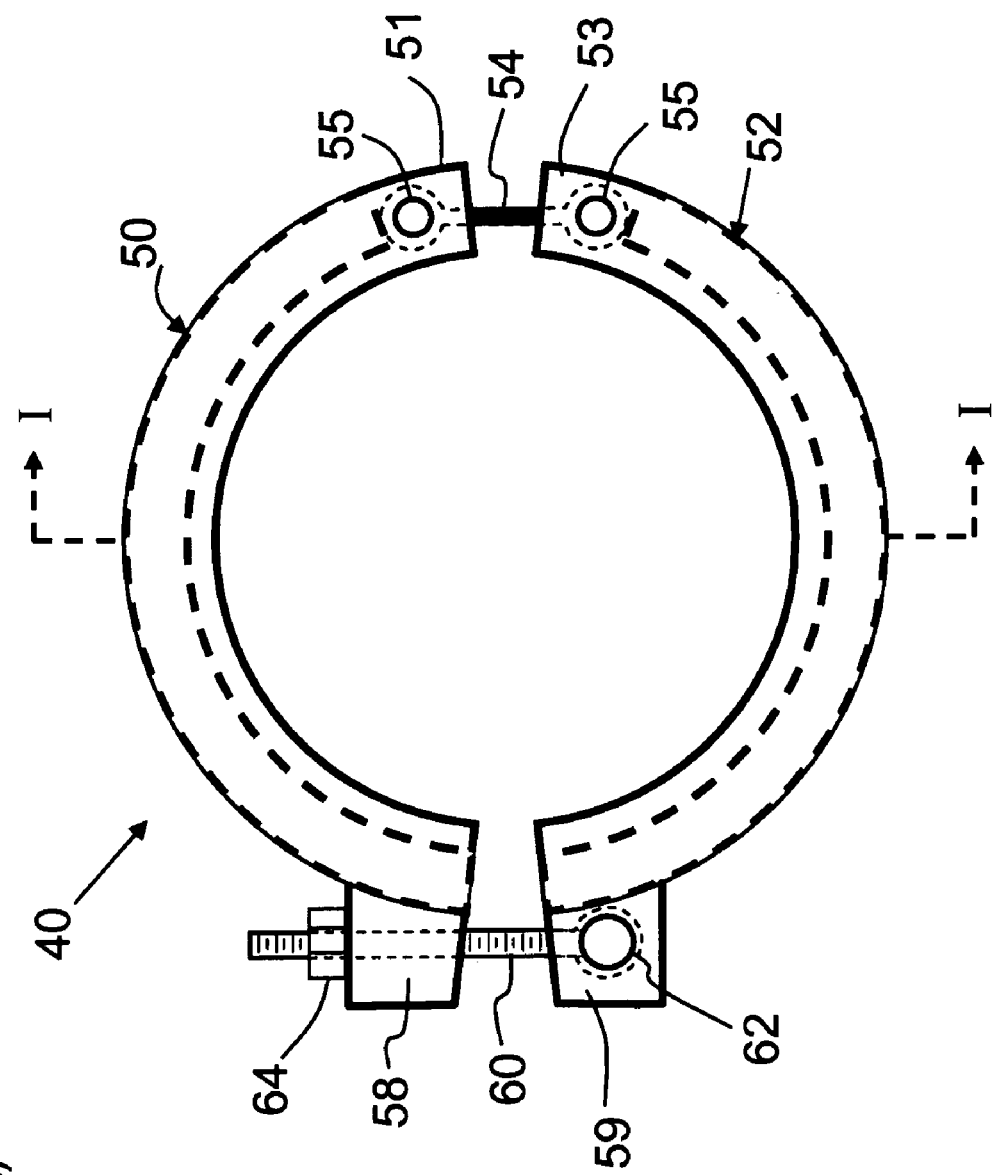
FIG. 2 is a plan view showing in greater detail the clamp used to secure the flanges joined to form the sealed joint depicted by FIG. 1, the cross-section of the clamp seen in FIG. 1 having been taken at level I-I.

A clamp means, such as split-ring clamp 40 of the type depicted by FIG. 2, and having an inner circumferential surface with a V-shape and tapered surface portions 42, encircles and securingly engages correspondingly tapered, frustoconical outer sections 36 of flanges 16 and 18. The tapered surfaces of the clamp and flange are inclined at an angle $\theta$ as shown in FIG. 3, with $\theta$ preferably ranging from about 15 to 25°. More preferably, $\theta$ is about 20°. Tightening the segments of clamp 40 imparts an axially directed force urging the flanges together. Flanged joints made using flanges having outside tapers, such as tapered surfaces 36 of flanges 16 and 18, in accordance with the present invention may be secured by clamps of a number of forms in addition to the type 40 depicted by FIG. 2. Any form of encircling clamp that produces an axially directed force applied to the tapered surface may be used. For example, linkage 54 and the nut and bolt fasteners 64, 60 may be replaced by other forms of lever engagement. The pivoting arrangement of linkage 54 may take alternate configurations. For example, linkage 54 and its attachments may be eliminated and ends 51 and 53 directly connected by a pivot pin. In still another form, linkage 54 and its attachments are replaced by a second nut and bolt fastener that is diametrically opposite and substantially similar to the first set used in the clamp of FIG. 2. Moreover, in the embodiment shown in FIGS. 2-3, both the outside tapered surfaces 36 of the flanges and the inside surface of clamp 40 have the shape of a frustoconical section of a right circular cone. In other embodiments of the invention, the clamping means comprises flanges and an encircling clamp either of which may have a taper that is other than the linear tapers shown in FIG. 3, such as curved tapers. Any such combination of shapes of the flanges and clamp interior that result in a clamping engagement that imparts a substantially uniform and axially directed force to the flanges may also be used.

The flanged joint provided herein may be used to join cylindrical pipes and tubes, e.g. those used in a process system. In addition, joints of the same form may be used to connect any combination of pipes, tubes, fittings, and other process equipment. The term "fittings" as used herein is to be understood as non-exclusively including adapters for connecting tubes of different sizes, ells for connecting pipes and tubes that are not collinearly directed, and fittings for connecting more than two pipes or tubes, such as tees and crosses. "Process equipment" as used herein non-exclusively comprises valves, filters, ports, reaction vessels, tanks, manifolds, pumps, and other components of a process system which are connected to place them in fluidic communication with other elements. As used herein and in the subjoined claims, the term "pipe" in relationship to a flanged joint is understood to include ordinary cylindrical pipe and tubing as well as any of the aforementioned fittings and process elements that are in fluidic communication with other elements through the joint. It is also to be understood that the axis of such fittings and process elements is the direction in which fluid enters or exits the element, which may or may not be a simple straight direction.

Figure 5:
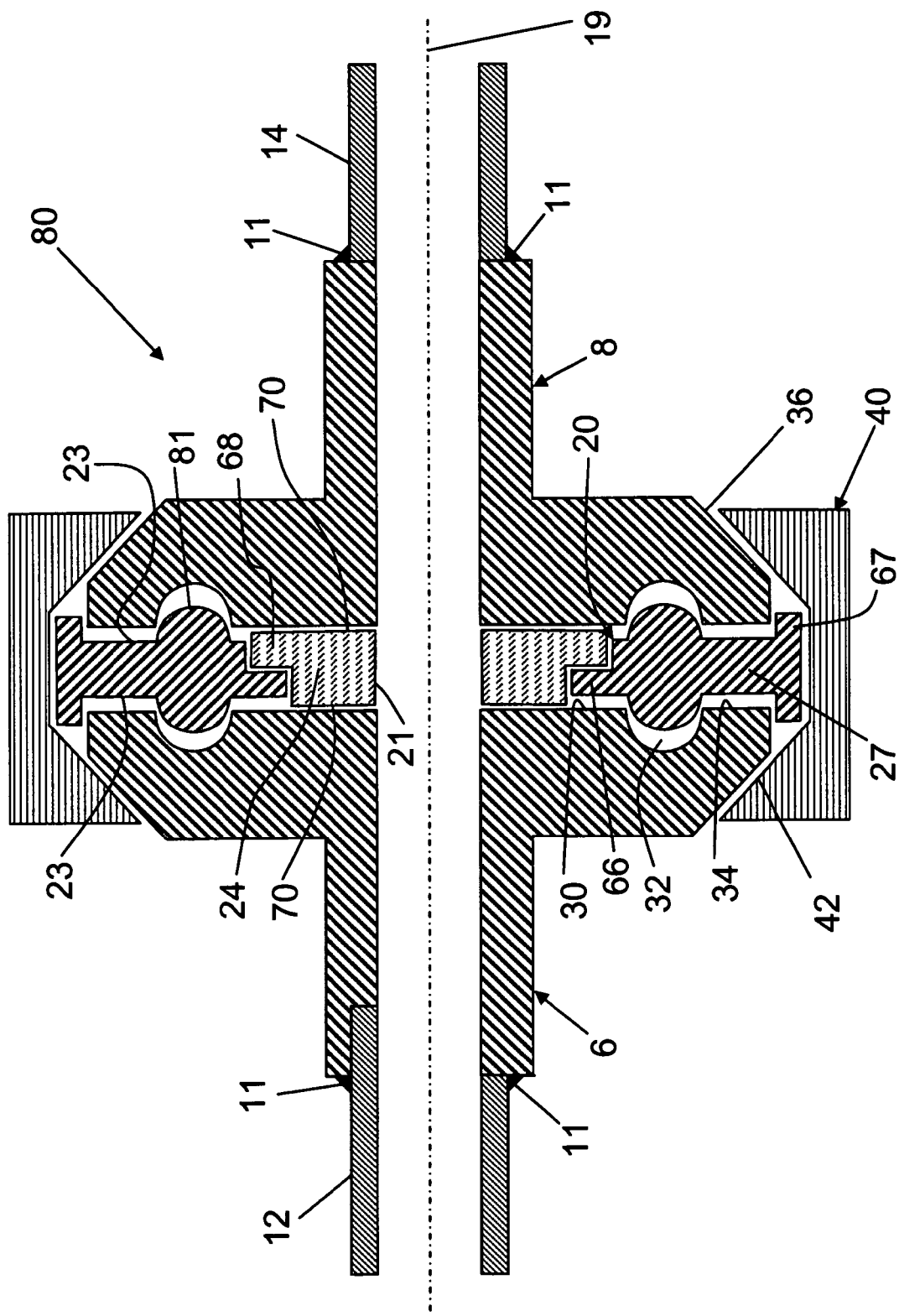
FIG. 5 is a cross-sectional view depicting another flanged joint system of the invention, wherein the gasket assembly contains a rectangular step engagement of retaining ring and sealing member and the flange mating faces include circumferential groove engaged with a similarly shaped feature of the retaining ring, with the cross section being taken along a common diametrical plane of the pipes.

Many flanged joints used in existing process systems are easily modified to the configuration of the joint system of the present invention. In particular, joints using flanges having forms such as those of flanges 6 and 8 depicted in FIG. 1 are commonly used. These joints may be retrofitted using suitably configured and dimensioned gasket assemblies of the invention. One such implementation 80 is shown in FIG. 5. In one aspect, such a retrofit may be accomplished by suitable choice of the relative thicknesses of inner portion 24 of sealing member 21 and outer ring 27 and the optional provision of axially enlarged portion 81 of retaining ring 27. Preferably, portion 81 has a shape complementary that of grooves 32, thereby providing additional positive alignment of flanges 6, 8 and gasket assembly 20.

Figure 6:
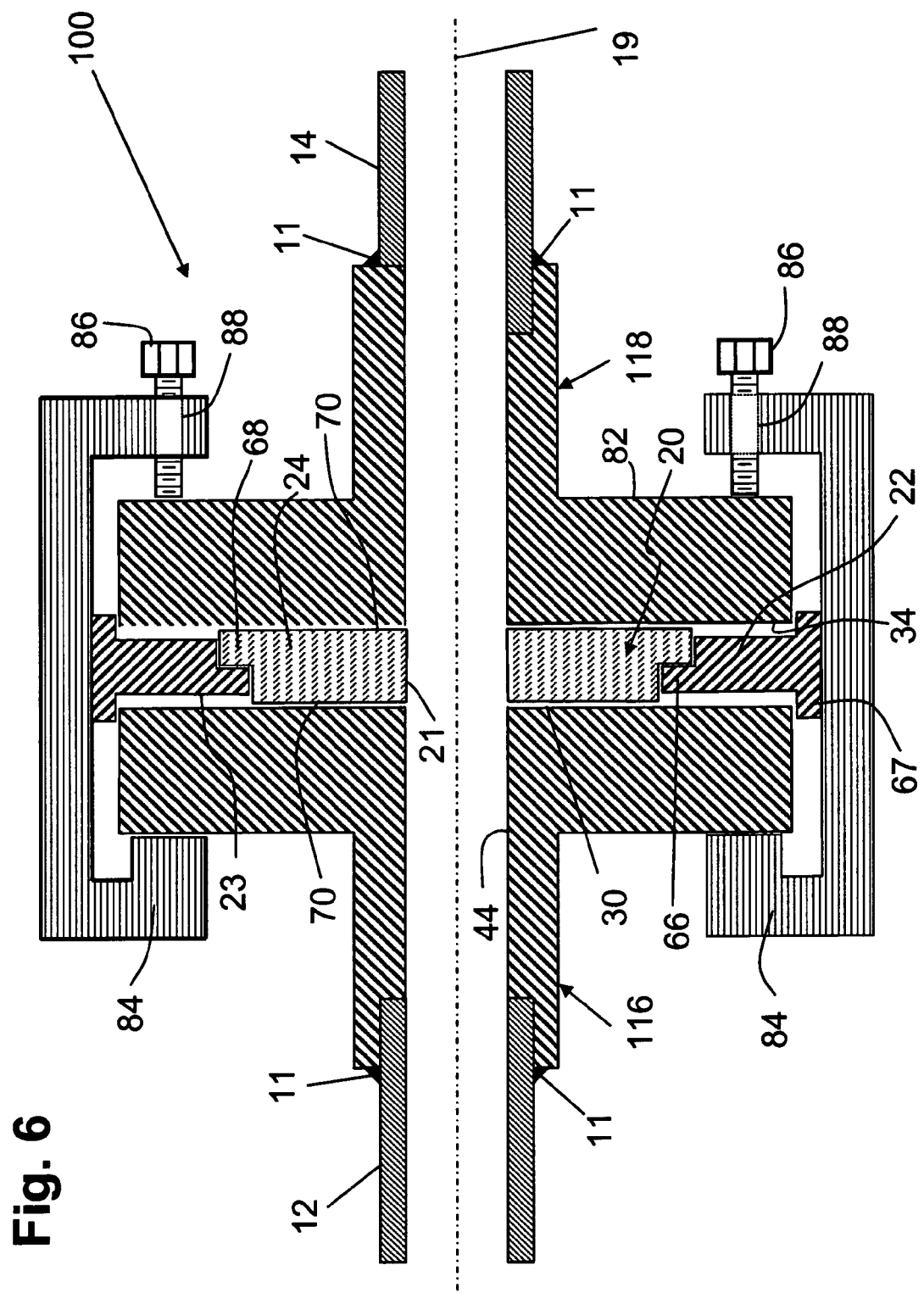
FIG. 6 is a cross-sectional view depicting another flanged joint system of the invention connecting two pipes, wherein the flanges are secured by C-clamps, with the cross section being taken along a common diametrical plane of the pipes.

In another aspect of the invention depicted by FIG. 6, joint 100 comprises flanges 116 and 118 having outside faces 82 that are parallel to their respective mating surfaces 30, 34. Such flanges may be secured by clamps of a number of types, including the plurality of C-clamps 84 shown in FIG. 6. Advancement of a threaded bolt 86 through tapped hole 88 in each clamp tightens the clamp, thereby placing flanges 116, 118 in axial compression and effecting a seal by compressing sealing portion 24 of gasket assembly 20. The compression of gasket assembly 20 is again limited to a preselected extent by retaining ring 22, which limits the axial impingement of flanges 116, 118.

Figure 7:
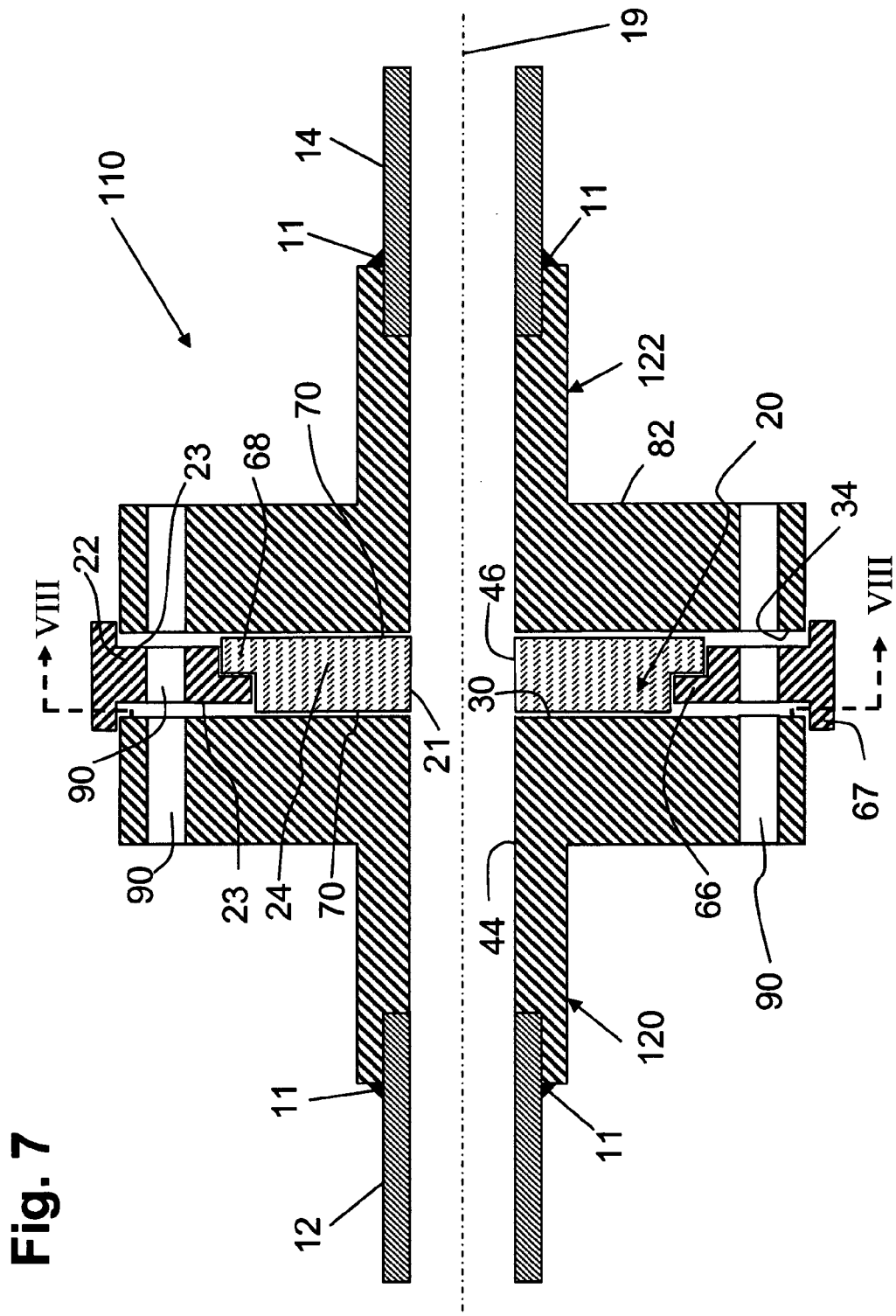
FIG. 7 is a cross-sectional view depicting still another flanged joint system of the invention connecting two pipes, wherein the flanges are secured by bolts through the flanges, with the cross section being taken along a common diametrical plane of the pipes.

In still another aspect of the invention, depicted by FIGS. 7-8, joint 110 comprises flanges 120, 122, which are provided with outside clamping faces 82 that are parallel to their respective mating surfaces 30, 34. As best seen in FIG. 8, flanges 120, 122 and retaining ring 124 are provided with a plurality of holes 90 located on a bolt circle 126 that is centered on the common central axis 19 of tubes 12, 14. Preferably the holes are equiangularly spaced about the bolt circle. In the embodiment shown in FIG. 8, four boltholes 90 spaced at equal 90° intervals are shown, but fewer or more holes may be provided, so long as their number is sufficient to effect uniform compression of the flanges. Flanges 120, 122 are mated positively in alignment and secured by fasteners, such as threaded bolts (not shown) that pass through holes 90 in both flanges and intermediately through aligned holes in ring 124 and are engaged by threaded nuts (not shown). Tightening the bolts brings gasket assembly into compression to an extent limited by the abutment of surfaces 34 and ring 124. Alternatively, the holes in one of the flanges and ring 124 may be sized to clear a bolt of a requisite size, with the complementary holes in the other flange being threaded to accommodate the selected bolt.

At least two clamps or bolts are used to secure the flanges in embodiments such as those depicted in FIGS. 6-8. A larger number is ordinarily preferred, in particular a number of clamps or bolts that is sufficient to ensure that force is evenly applied around the circumference of the flanges. Flanges of larger diameter typically require a larger number of clamps or bolts to prevent uneven force that may, in some cases, cause the flange to bend or warp, thereby compromising the integrity of the seal.

In the various embodiments of the flanged joint of the invention, the axial approach of the flanges is positively limited by contact of mating surface portions 34 with the axially opposite sides 23 of retaining ring 22. The axial thickness of sealing portion 24 is selected to be slightly greater than that of ring 22, so that a requisite degree of compression of portion 24 is achieved when the flanges are engaged to the limit defined by retaining ring 22. As a result, dead volume in which any process fluid inadvertently leaked from the flange bore could become trapped or stagnant is substantially eliminated. The absence of such dead space is especially important in systems used for aseptic processing of foodstuffs, beverages, pharmaceuticals, or the like, intended for human or animal consumption. Preferably, the inner diameter of sealing member 21 is selected such that the assembled flange joint system has a smooth inner bore through its entire axial length. That is to say, when sealing member 21 is in its compressed state after normal installation in the joint of the invention, inner surface 46 of portion 21 and inner surface 44 of flanges 16 and 18 have substantially the same inside diameter and no gasket material intrudes into the bore. As a result, there is substantially no discontinuity at the transitions between flanges 16 and 18, and sealing member 21. In many prior art systems without the compression limit afforded by ring 22, overtightening and poor alignment frequently results in the extrusion of gasket material into the cylindrical bore of flanges in the joint region. A bore through the full joint with a smooth inner surface affords significant advantages. Flow of process fluid within the piping system is not impeded by unwanted turbulence. There are no projections that restrict draining of the piping system, even in horizontal runs. The configuration substantially eliminates the possibility that small pieces of extruded material, which are prone to becoming dislodged, would enter and contaminate the process stream. The smoothness is especially valuable in aseptic systems, since traps and dead zones are likely sites for harmful contamination and microbial activity. Furthermore, the retaining ring also provides protection against blowout of the sealing member under extreme overpressure conditions within the piping system.

A wide variety of materials are suitable for the components of the present joint system. In general, the materials must have mechanical and chemical properties that remain compatible with the conditions they are likely to encounter during their intended useful lifetime in a given process apparatus, with an acceptable margin of safety for process excursions and material variability. In particular, materials exposed to the process stream must be chemically stable, and the mechanical properties must be adequate for the joint to maintain its integrity during the joint lifetime.

The flanges are preferably composed of metal or metal alloys, including non-exclusively steel, copper, aluminum, brass, and nickel. Preferred alloys for the flanges include austenitic and ferritic stainless steels, Ni-base superalloys, monel, and inconel. Many of these alloys afford improved corrosion resistance and acceptable high temperature properties. Optionally, at least part of the flange mating surfaces or the flange bore are coated, plated, hardfaced, or otherwise beneficially treated with suitable substances to improve any of their properties. Ideally, the flanges are composed of alloy that is easily processed or machined as needed to provide the required configuration, but has sufficient hardness and strength to resist scratching, wear, or mechanical degradation during assembly and operation, and especially during servicing. The flanges must be amenable to attachment to other piping systems by the desired means, such as the aforementioned welding, brazing, or soldering. Most important, the flanges must be made of material that is chemically compatible with the process fluid conveyed therethrough and withstand normal operating temperatures and pressures with an adequate safety margin.

The retaining ring is preferably composed of metal, metal alloy, or hard plastic or rubber of sufficient strength and modulus to render it substantially rigid. More preferably, the ring is composed of the same material used to construct the flanges.

A wide range of materials are suitable for constructing the sealing member, which is preferably composed of deformable elastomeric, polymeric, composite or fibrous materials, or soft metal. Such materials include natural, synthetic, and silicone-based rubbers. Frequently used rubber materials include ethylene propylene (EPDM), ethylene acrylate, polychloroprene (NEOPRENE®), nitrile (Buna), fluorocarbon (FKM, VITON® and Kel-F), silicone, and fluorosilicone rubbers. Other polymeric materials are also used, such as PTFE (TEFLON®), CTFE, PFA, and PEEK. Composite materials such as polysteel, which includes stainless steel powder in a PTFE matrix, may be used, despite being less compliant. The sealing member must be sufficiently deformable to achieve a reliable seal. More preferably, the material is highly compliant and resiliently deformable and does not take a "set" as a result of creep or other mechanical degradation during extended storage or operation. Most preferably, the sealing member is an elastomer or polymer. Suitable sealing members preferably exhibit durometer ratings in the range of about 70 to 90 Shore A. Other desired characteristics of sealing materials include low cost, ease of fabrication, and lack of significant environmental concerns. It is further preferred that no other sealants be required, since many known sealants would contaminate the process stream or cause degradation of typical elastomers.

Having thus described the invention in rather full detail, it will be understood that such detail need not be strictly adhered to but that various changes and modifications may suggest themselves to one skilled in the art, all falling within the scope of the present invention as defined by the subjoined claims.

What is claimed is:

1. A flanged joint system connecting first and second pipes disposed along a common axis, comprising:
   a) a first flange terminating said first pipe and a second flange terminating said second pipe, each of said flanges being generally circular and having a flange outside diameter and a mating surface, said pipes being oriented such that said mating surfaces are substantially perpendicular to said common axis and in facing, parallel relationship;
   b) a gasket assembly comprising:
      (i) an outer annular, substantially rigid retaining ring having opposed axial surfaces abutting at least a portion of said mating surfaces, an alignment rim encircling an outside periphery of said ring and extending axially from each of said axial surfaces, and a retaining shoulder projecting radially inward, said alignment rim being sized to slippably receive said outside diameter of said flanges on opposite sides of said retaining ring;
      (ii) an inner deformable annular sealing member having a radially inner annular portion having a rectangular cross-section and sealing surfaces on opposed axial sides of said rectangular portion, and an encircling sealing shoulder portion that projects radially outward, said sealing shoulder portion being shaped to receive said retaining shoulder and being removably engaged therewith; and
      said gasket assembly being interposed between said flanges and aligned coaxially therewith by receipt of said outside diameter within said alignment rim;
   c) a clamp means for urging said flanges together axially, whereby said deformable annular sealing member is compressed to a preselected extent, the compression being restricted by abutment of said axial surfaces of said retaining ring with said mating surfaces of said flanges; and
   wherein said retaining shoulder and said sealing shoulder portion provide an angulated step engagement.

2. A flanged joint system as recited by claim 1, wherein said inner annular sealing member is resiliently deformable.

3. A flanged joint system as recited by claim 1, wherein said inner annular sealing member is composed of an elastomer.

4. A flanged joint system as recited by claim 1, wherein said sealing member is composed of a material selected from the group consisting of PTFE, PFA, polysteel, Buna, EPDM, silicone, FKM, PEEK, and CTFE materials.

5. A flanged joint system as recited by claim 1, wherein said inner angular sealing member is composed of a composite material comprising a polymer.

6. A flanged joint system as recited by claim 1, wherein said retaining ring is composed of metal.

7. A flanged joint system as recited by claim 1, wherein said retaining ring is composed of a substantially rigid plastic.

8. A flanged joint system as recited by claim 1, wherein said clamp means comprises at least one clamp.

9. A flanged joint system as recited by claim 8, wherein said flanges have tapered outer sections and said clamp means comprises a split-ring clamp having an inner circumferential surface with tapered surface portions that encircle and securely engage said tapered outer sections.

10. A flanged joint system connecting first and second pipes disposed along a common axis, comprising:
    a) a first flange terminating said first pipe and a second flange terminating said second pipe, each of said flanges being generally circular and having a flange outside diameter and a mating surface, said pipes being oriented such that said mating surfaces are substantially perpendicular to said common axis and in facing, parallel relationship;
    b) a gasket assembly comprising:
       (i) an outer annular, substantially rigid retaining ring having opposed axial surfaces abutting at least a portion of said mating surfaces, an alignment rim encircling an outside periphery of said ring and extending axially from each of said axial surfaces, and a retaining shoulder projecting radially inward, said alignment rim being sized to slippably receive said outside diameter of said flanges on opposite sides of said retaining ring;
       (ii) an inner deformable annular sealing member having a radially inner annular portion having a rectangular cross-section and sealing surfaces on opposed axial sides of said rectangular portion, and an encircling sealing shoulder portion that projects radially outward, said sealing shoulder portion being shaped to receive said retaining shoulder and being removably engaged therewith; and
       said gasket assembly being interposed between said flanges and aligned coaxially therewith by receipt of said outside diameter within said alignment rim;
    c) a clamp means for urging said flanges together axially, whereby said deformable annular sealing member is compressed to a preselected extent, the compression being restricted by abutment of said axial surfaces of said retaining ring with said mating surfaces of said flanges; and
    wherein said retaining shoulder and said sealing shoulder portion provide a rounded and lobed engagement.

11. A flanged joint system as recited by claim 10, wherein said inner annular sealing member is resiliently deformable.

12. A flanged joint system as recited by claim 10, wherein said inner annular sealing member is composed of an elastomer.

13. A flanged joint system as recited by claim 10, wherein said sealing member is composed of a material selected from the group consisting of PTFE, PFA, polysteel, Buna, EPDM, silicone, FKM, PEEK, and CTFE materials.

14. A flanged joint system as recited by claim 10, wherein said inner angular sealing member is composed of a composite material comprising a polymer.

15. A flanged joint system as recited by claim 10, wherein said retaining ring is composed of metal.

16. A flanged joint system as recited by claim 10, wherein said retaining ring is composed of a substantially rigid plastic.

17. A flanged joint system as recited by claim 10, wherein said clamp means comprises at least one clamp.

18. A flanged joint system as recited by claim 17, wherein said flanges have tapered outer sections and said clamp means comprises a split-ring clamp having an inner circumferential surface with tapered surface portions that encircle and securingly engage said tapered outer sections.

* * * * *